July 21, 1964 G. W. EMMERT 3,141,585
MEASURING DEVICE FOR HAZARDOUS LIQUIDS
Filed June 15, 1962 2 Sheets-Sheet 1
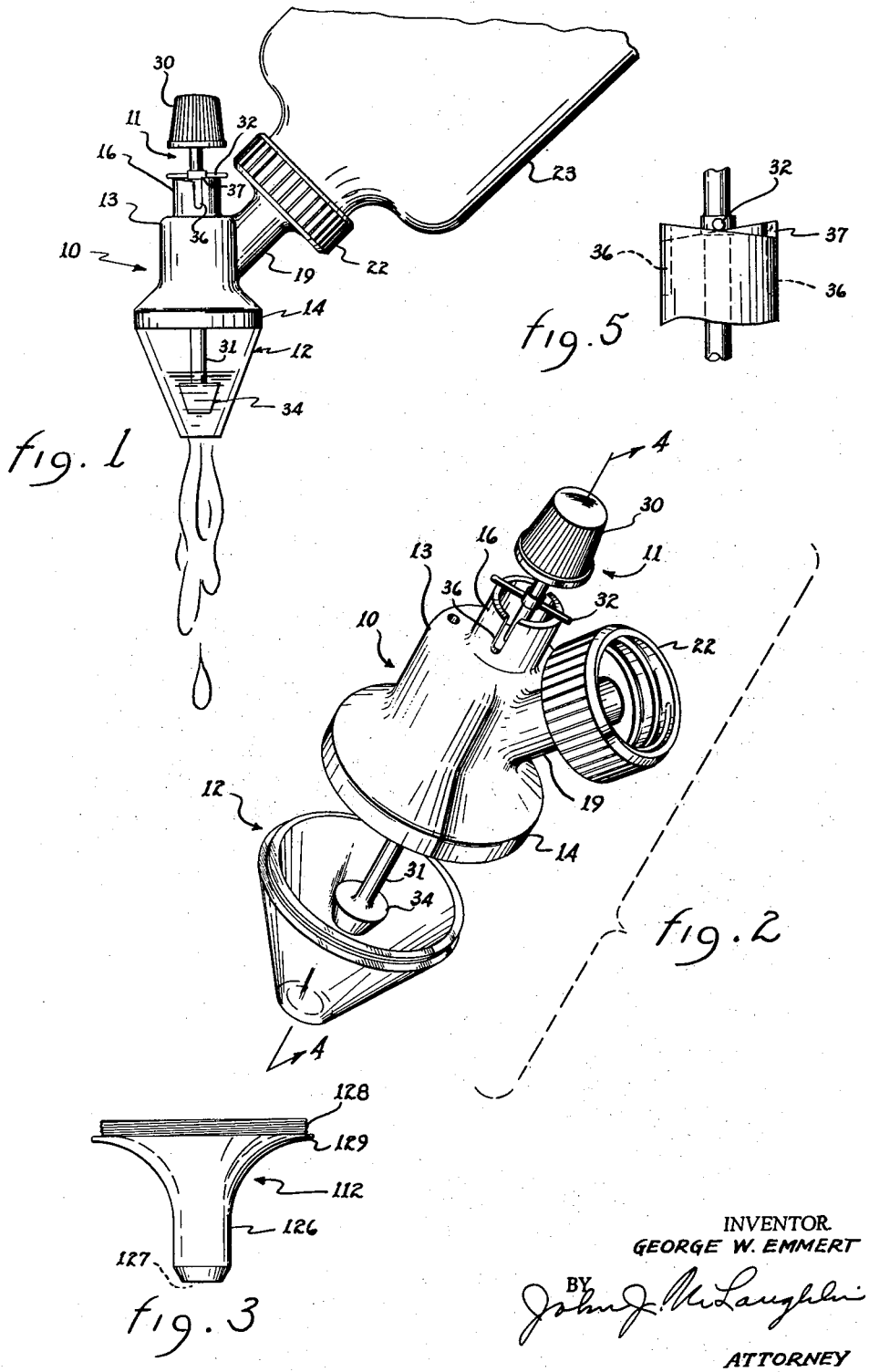
INVENTOR.
GEORGE W. EMMERT
ATTORNEY July 21, 1964  G. W. EMMERT  3,141,585
MEASURING DEVICE FOR HAZARDOUS LIQUIDS
Filed June 15, 1962  2 Sheets-Sheet 2
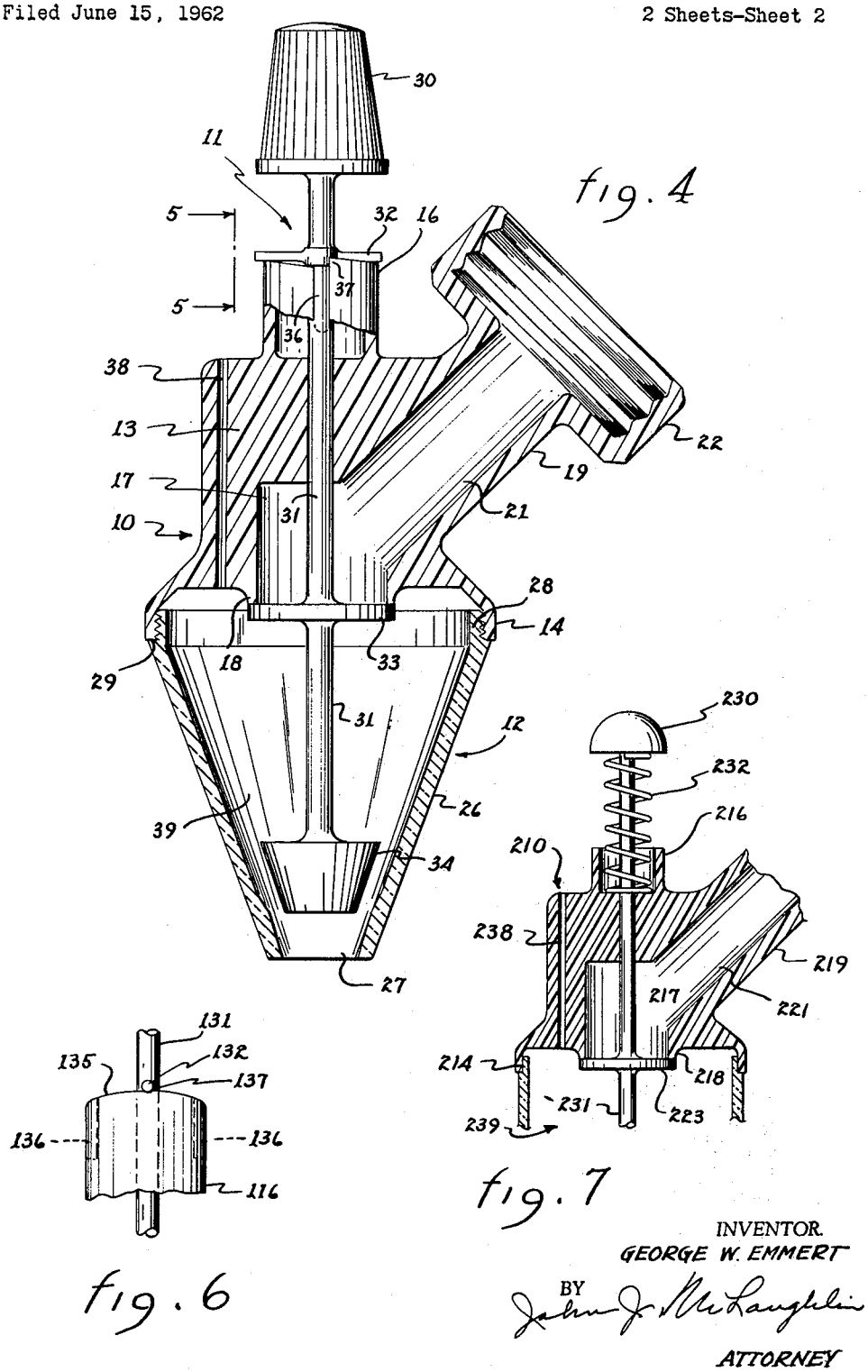
INVENTOR.
GEORGE W. EMMERT
BY
ATTORNEY 3,141,585
MEASURING DEVICE FOR HAZARDOUS LIQUIDS
George W. Emmert, Box 263, Rte. 5, Catalina Foothills, Tucson, Ariz.
Filed June 15, 1962, Ser. No. 202,896
12 Claims. (Cl. 222—434)

My invention relates in general to the measuring and dispensing of liquids. It relates more in particular to a measuring device for hazardous liquids, and by this I mean chemical liquids or mixtures of liquids which, because of their causticity, acidity, corrosiveness, toxicity or the like, cannot be handled suitably and inexpensively by available measuring and dispensing apparatus and methods.

Equipment for attachment to a liquid-holding container functioning to measure a predetermined quantity of the liquid and then to dispense the same are very old, and a large number of such devices are available. Each has certain advantages and disadvantages. In general, they may be divided into two classes, viz., those which function readily and rapidly by the gravity movement or manual operation of a contained part in which, as a rule, precise control is not obtained. There is also a class of measuring and dispensing devices for attachment to a liquid container which aims at precise control of the liquid and careful avoidance of leakage. These devices, as a rule, employ a measuring chamber and a compression spring which must be further compressed with the finger either to flow the liquid from the container into the measuring chamber, or from the measuring chamber into a receiving vessel. If the spring is strong enough to make a seal, it is usually so hard to compress with the finger that faulty measuring eventuates.

Still another problem with most liquid measures and dispensers of the prior art is that they are frequently complicated and expensive, and cannot readily be fabricated from special materials resistant to corrosive or etching attack from the hazardous liquid being handled.

The object of my present invention is to produce an improved measuring and dispensing device which avoids the shortcomings of devices of the prior art.

Other specific objects and features of the invention will be apparent from the following detailed description of a preferred embodiment of the invention, taken with the accompanying drawings, wherein:

FIG. 1 shows a preferred embodiment of the device of the present invention in position on a container, and in the act of dispensing a liquid which has previously been allowed to flow into the measuring chamber;

FIG. 2 is a perspective view at approximately full-scale (but enlarged with respect to FIG. 1), but with the removable transparent portion of the measuring chamber removed to show construction;

FIG. 3 is a modification of the removable portion of the measuring chamber, effective to change the amount of liquid measured and dispensed;

FIG. 4 is an enlarged sectional view taken on the line 4—4 of FIG. 2;

FIG. 5 is a fragmentary elevational view looking along the line 5—5 of FIG. 4;

FIG. 6 is a modification of the detail shown in FIG. 5, and

FIG. 7 is a further modification.

The embodiment of the present invention shown in the drawings was designed primarily for handling a liquid chemical compound which was found to attack all possible available construction materials except glass and linear polyethylene plastic. All of the parts, therefore, as will be explained, are made either of glass or linear polyethylene.

The device shown in the drawings comprises three molded integral sub-assemblies. They are a body indicated generally by the reference numeral 10 molded in one piece, a stem assembly indicated by the reference character 11, and a removable measuring chamber sub-assembly 12 molded in one piece out of glass.

First referring to the body 10, it includes a main body portion 13 of generally cylindrical shape with a bottom skirt 14 and top tubular projection 16. The main body portion 13 has a relatively large central open area 17 (FIG. 4), immediately below which is a lower annular projection 18 which, as will be explained, lies in the measuring chamber and forms a valve seat. An angular projection 19 from the main body portion 13 has an axial passageway 21 communicating with the open area 17. A threaded boss 22 in the nature of a threaded bottle cap is adapted for attachment to a threaded neck of a botle 23 (FIG. 1). It will be noted by reference to FIG. 1 that the angularity of the projection 19 is such that when the botle 23 is up-turned to a position to pour out all of the liquid, the axis of the device is approximately vertical.

The measuring chamber sub-assembly 12 is of generally conical shape with tapering side wall 26, a frusto conical end opening 27 which, as noted, may have slightly less taper than the side wall 26. The tapered opening 27, as will be explained, acts as a valve seat. An externally threaded upper flange 28 is in threaded relation with matching internal threads on the skirt 14. An annular external shoulder 29 seals against the bottom surface of the skirt 14. The sub-assembly 12 is transparent so that the inside of the measuring chamber may be seen at all times.

The stem assembly 11 has a uniform diameter stem 31 in sealed but slidable relation in an axial opening or bore molded into or otherwise provided in the main body portion 13 of the body assembly 10. The stem has an external knob-like finger engageable enlargement 30 by means of which the stem may be rotated or moved bodily axially of the body 10. It has also a transversely disposed latching retainer 32 shown in the form of a radial cross-piece, the precise functioning of which will be described below. The stem 31 also carries a disc-shaped valve 33 engageable against the annular seat 18, and a frustro conical valve 34 at its bottom end adapted to engage the valve seat formed by the tapered opening 27.

The tubular projection 16 has a pair of oppositely positioned latch releasing slots 36 parallel to the axis of the stem 31 and into which the projecting ends of the latching retainer 32 may extend to permit body movement of the stem assembly 11 in a direction to open valve 33 and close valve 34. The top edges of the tubular projection 16 between the slots 36 form cams engaged by the latching retainer 32 to pull the stem assembly in a direction to draw the disc valve 33 firmly against its seat. Each cam forms a shoulder 37, so that the stem may be turned in only one direction to seal valve 33 against its seat. Conversely, when the valve is released and valve 34 closed, the latching retainer 32 engages the two shoulders 37 and stops in a position directly above the slots 36.

A narrow air passageway 38 extends through the main body portion 13, one end being in communication with the measuring chamber 39 and the other end in communication with ambient atmosphere. Thus, both when the measuring chamber is being filled and discharged, air may flow through the passageway first as liquid replaces it, and then as it again replaces the liquid.

FIG. 3 shows a modification in which the measuring chamber sub-assembly, here identified by the reference character 112, has an inwardly flared side wall to decrease the capacity of the measuring chamber indicated by the numeral 39 in FIG. 4. Thus, if the measuring chamber 38 holds one tablespoonful of liquid, applying the assembly of FIG. 3 may reduce the measure to, say, one-half a tablespoonful. In FIG. 3 some of the specific parts are identified with the same reference characters as the assembly 12 in FIGS. 1, 2 and 4 with, however, the prefix "1" to denote modification.

FIG. 6 shows a further modification in which the tubular projection 116 has two opposite slots 136, but in which the cams 135 are rounded and each cam has a very shallow top recess into which the latching retainer 132 can drop. Thus, in this embodiment the stem assembly may be turned in either direction to engage the valve 33 and in either direction to release it. By applying slight end pressure as the stem assembly is turned the latching retainer 132 will be caused to automatically drop into the slots 136.

The three sub-assemblies 10, 11 and 12 are fabricated separately of suitable material, depending on several factors including the material to be handled. In the embodiment described, the measuring chamber sub-assembly is accurately finished molded out of a good grade of hard glass and is preferably transparent. The body assembly is suitably molded in one piece of plastic, such as linear polyethylene, if certain types of liquids are handled. The stem assembly may be formed of plastic and it may be the same plastic used for the body. The transverse latching member 32 and exterior knob are formed separately in the specific embodiment shown, and suitably attached to the stem 31 as by plastic molding after the stem has been assembled with the body assembly.

Those skilled in the art will understand that the threads shown in the drawings attaching the sub-assembly 12 to the skirt 14 are in general difficult and expensive to produce. I may, therefore, employ any of the common releasable attaching means, when the sub-assembly 12 is to be removable, and other attaching means when the sub-assembly 12 may be permanently attached. Thus, a common type of bayonet joint can be used with a bead on the glass-piece, for example, and a groove or recess in the plastic. The parts may also have a friction press fit, may be cemented, or a relatively new technique known as "spin welding" may be used. These are all illustrative.

The type and combination of materials used may also be modified. In the embodiment described for handling a specially difficultly handle-able liquid, a combination of linear polyethylene and glass was used, the latter to provide transparency because the linear polyethylene is opaque. It appears just a matter of time, however, until transparent linear polyethylene will be available, or some other clear plastic having the same general properties. Many plastics, clear and opaque, are, of course, available from which the entire device may be made, depending on the liquid being measured. The attaching means between the sub-assembly 12 and skirt 14 frequently must be chosen because of the properties of the materials used. Thus, linear polyethylene and glass cannot be cemented together by any method known to me now.

In operation, the device having been attached to a bottle 23 of liquid to be measured out, the stem assembly is normally latched upwardly to positively seal the contents. When a measured amount of the liquid is to be removed, the device is tipped to the position shown in FIG. 1 with the stem assembly still latched. The stem assembly is turned while so holding the bottle and the stem assembly moved to close valve 34 and open valve 33. Liquid then flows into and fills the measuring chamber. The stem assembly is then raised and rotated to open valve 34 and seal valve 33. Liquid in the measuring chamber then flows through passageway 27. The body portion assembly and stem assembly, being formed of linear polyethylene, are opaque, but the assembly 12 is transparent and the action within the measuring chamber can always be seen.

The versatility of my device is illustrated in part by the ease with which I can convert it to spring operation for uses in connection with which such a modified device will have adequate utility. I have, therefore, shown FIG. 7 as a further modification in which the device of the present invention may be simply modified to include a light spring normally holding the parts of the device in closed relation. For convenience the parts corresponding to FIG. 4 are given the same reference characters with the prefix "2" added. A light compression spring 232 replaces the latching member-cam surface combination. The annular projection 216 acts as a spring retainer and it is plain with no slots or cam surfaces. If the cam surfaces and slots should already be molded in place, they will not affect the action of the spring assembly. The spring being light, the stem assembly is easily depressed with the thumb to open valve 33 and close valve 34. When the measuring chamber 239 is full, the knob 230 is merely released, and the valve 234 is opened and the liquid flows out.

It will be noted that the attachment between the measuring sub-assembly and the skirt 214 is by press fit or by cementing. The device of FIG. 7 will normally be inexpensive and formed throughtout of relatively inexpensive plastic. Its accuracy is sufficient, for example, for measuring a liquid soap used in the household for such purposes as washing dishes. It may, for example, replace a bottle cap as a liquid soap measuring and dispensing means.

My invention may take other forms within the scope of the appended claims.

I claim:
1. A measuring device of the type described, comprising:
 (a) a single piece molded body sub-assembly having
  (1) a body portion with a central opening therein,
  (2) an annular skirt,
  (3) an annular projection around said central opening co-axial with said skirt and forming an annular valve seat,
  (4) an angular projection from the body portion with an axial passageway communicating with said central opening and an internally threaded boss for attachment to a bottle or the like,
 (b) a measuring chamber sub-assembly having
  (1) a flange releasably engaging said skirt,
  (2) a generally annular side wall integral with said flange and tapering down to a central opening, and
  (3) means forming a tapered valve seat within said opening,
  (4) said measuring sub-assembly and body portion forming a mixture chamber,
 (c) a valve stem assembly having
  (1) a valve stem reciprocally supported in a central axial opening in the body portion and projecting exteriorly thereof, and
  (2) valves in the stem engageable against said seats,
  (3) said valves being disposed in the mixing chamber and so related to each other and to said seats, that as one valve closes the other opens, and
 (d) means for reciprocating said stem assembly in a forward direction to control admission of fluid to the measuring chamber, and in the opposite direction to discharge from the measuring chamber the liquid so introduced.

2. A measuring device of the type described, comprising:
 (a) a single piece molded body sub-assembly having
  (1) a body portion with a central opening therein,
  (2) an annular skirt, (3) an annular projection around said central opening co-axial with said skirt and forming an annular valve seat,
(4) an angular projection from the body portion with an axial passageway communicating with said central opening and an internally threaded boss for attachment to a bottle or the like,
(5) an upper annular projection from the body portion,
(b) a measuring chamber sub-assembly having
(1) a flange releasably engaging said skirt,
(2) a generally annular side wall integral with said flange and tapering down to a central opening, and
(3) means forming a tapered valve seat within said opening,
(4) said measuring sub-assembly and body portion forming a mixing chamber,
(c) a valve stem assembly having
(1) a valve stem reciprocally supported in a central axial opening in the body portion and projecting exteriorly thereof, and
(2) valves in the stem engageable against said seats,
(3) said valves being disposed in the mixing chamber and so related to each other and to said seats that as one valve closes the other opens,
(d) means for reciprocating said stem assembly in a forward direction to control admission of fluid to the measuring chamber, and in the opposite direction to discharge from the measuring chamber the liquid so introduced,
(e) and means including said upper annular projection for holding said stem assembly firmly in retracted position.

3. A measuring device of the type described, comprising:
(a) a single piece molded body sub-assembly having
(1) a body portion with a central opening therein,
(2) an annular skirt,
(3) an annular projection around said central opening co-axial with said skirt and forming an annular valve seat,
(4) an angular projection from the body portion with an axial passageway communicating with said central opening and an internally threaded boss for attachment to a bottle or the like,
(5) an upper annular projection from the body portion,
(b) a measuring chamber sub-assembly having
(1) a flange engaging said skirt,
(2) a generally annular side wall integral with said flange and tapering down to a central opening, and
(3) means forming a tapered valve seat within said opening,
(4) said measuring sub-assembly and body portion forming a mixture chamber,
(c) a valve stem assembly having
(1) a valve stem reciprocally supported in a central axial opening in the body portion and projecting exteriorly thereof,
(2) valves in the stem engageable against said seats,
(3) said valves being disposed in the mixing chamber and so related to each other and to said seats that as one valve closes the other opens, and
(4) a knob on said projecting end of the stem,
(d) a light compression coil spring disposed around the stem between the body and said knob and within said upper annular projection as a guide,
(e) said stem being depressable against the compression of the spring to admit liquid to the measuring chamber and to retain the same, and movable by action of the spring when released to allow liquid to flow from the measuring chamber but to prevent flow into the measuring chamber.

4. A measuring device of the type described, comprising:
(a) a single piece molded body sub-assembly molded entirely in one piece out of linear polyethylene having:
(1) a body portion with a central opening therein,
(2) an annular skirt,
(3) an annular projection around said central opening co-axial with said skirt and forming an annular valve seat,
(4) an angular projection from the body portion with an axial passageway communicating with said central opening and an internally threaded boss for attachment to a bottle or the like,
(b) a measuring chamber sub-assembly molded entirely in one piece of transparent glass having:
(1) a flange engaging said skirt,
(2) a generally annular side wall integral with said flange and tapering down to a central opening, and
(3) means forming a tapered valve seat within said opening.
(4) said measuring sub-assembly and body portion forming a mixing chamber,
(c) a valve stem assembly having
(1) a valve stem reciprocally supported in a central axial opening in the body portion and projecting exteriorly thereof,
(2) valves in the stem engageable against said seats,
(3) said valves being disposed in the mixing chamber and so related to each other and to said seats that as one valve closed the other opens,
(4) at least that part of the stem assembly comprising the valves and lying within the measuring chamber being formed of linear polyethylene,
(d) means for reciprocating said stem assembly in a forward direction to control admission of fluid to the measuring chamber, and in the opposite direction to discharge from the measuring chamber the liquid so introduced.

5. In a measuring device of the type described, comprising:
(a) a single piece molded body sub-assembly having
(1) a body portion with a central opening therein,
(2) an annular skirt,
(3) an annular projection around said central opening co-axial with said skirt and forming an annular valve seat,
(4) an angular projection from the body portion with an axial passageway communicating with said central opening and an internally threaded boss for attachment to a bottle or the like,
(5) an upper annular projection from the body portion,
(6) said annular projection having a pair of oppositely placed parallel slots and top cam surfaces between the slots,
(b) a measuring chamber sub-assembly having
(1) a flange engaging said skirt,
(2) a generally annular side wall integral with said flange and tapering down to a central opening, and
(3) means forming a tapered valve seat within said opening,
(4) said measuring sub-assembly and body portion forming a mixture chamber,
(c) a valve stem assembly having
(1) a valve stem reciprocally supported in a central axial opening in the body portion and projecting exteriorly thereof, and (2) valves in the stem engageable against said seats, (3) said valves being disposed in the mixing chamber and so related to each other and to said seats that as one valve closes the other opens, (4) a latching retainer carried by the stem in the form of a radial cross-piece adapted to engage in the slots to permit longitudinal reciprocal movement of the stem assembly, and (5) to hold the stem assembly firmly in retracted valve closing position when the latching retainer is engaged against said top cam surfaces by rotation of the stem assembly.

6. In a measuring device of the type described, comprising:
(a) a single piece molded body sub-assembly having
(1) a body portion with a central opening therein,
(2) an annular skirt,
(3) an annular projection around said central opening co-axial with said skirt and forming an annular valve seat,
(4) an angular projection from the body portion with an axial passageway communicating with said central opening and an internally threaded boss for attachment to a bottle or the like,
(5) an upper annular projection from the body portion,
(6) said annular projection having a pair of oppositely placed parallel slots and top cam surfaces between the slots,
(b) a measuring chamber sub-assembly having
(1) a flange engaging said skirt,
(2) a generally annular side wall integral with said flange and tapering down to a central opening, and
(3) means forming a tapered valve seat within said opening,
(4) said measuring sub-assembly and body portion forming a mixture chamber,
(c) a valve stem having
(1) a valve stem reciprocally supported in a central axial opening in the body portion and projecting exteriorly thereof,
(2) a tapered valve at one end of the stem within the measuring chamber and engaged against said tapered seat to close the measuring chamber against loss of liquid when the stem is pushed toward said measuring chamber sub-assembly,
(3) a disc valve carried by the stem within the measuring chamber and engageable against said annular valve seat,
(4) said disc valve being out of engagement with its seat when the tapered valve is closed to permit liquid to flow into and fill the measuring chamber, but
(5) engaged against its seat to prevent liquid from flowing into the measuring chamber when the said tapered valve is open,
(6) a latching retainer carried by the stem in the form of a radial cross-piece adapted to engage in the slots to permit longitudinal reciprocal movement of the stem assembly, and
(7) to hold the stem assembly firmly in retracted valve closing position when the latching retainer is engaged against said top cam surfaces by rotation of the stem assembly.

7. A measuring device as defined in claim 6, wherein:
(a) said top cam surfaces comprise two surfaces between the slots, each such surface generating a partial helix to thereby form a shoulder at each slot, whereby the latching retainer and cam relation permits rotation of the stem in only one direction to engage said cam surface, and whereby when the stem is rotated in a reverse direction to release the same, the latching retainer engages said shoulder to align the said latching retainer and said slots.

8. A measuring device as defined in claim 6, wherein:
(a) said top cam surfaces comprise two surfaces between the slots, each such surface defining a convex curve with a pair of slight central notch-like surface depressions in each can curve, whereby when the latching retainer is released from the said two slots the stem may be rotated in either direction and engage in said notch-like surface depressions, and wherein said stem may then be rotated in either direction to release said cam surface and cause said latching retainer to drop into the said two slots.

9. A measuring device as defined in claim 6, wherein:
(a) said body sub-assembly and at least that part of the stem sub-assembly within the measuring chamber are formed of opaque linear polyethylene, and wherein said measuring chamber sub-assembly is formed of transparent glass.

10. A measuring device as defined in claim 1, including
(a) a relatively narrow passageway through said main body portion, one end of which passageway is in communication with the measuring chamber and one end in communication with ambient atmosphere.

11. In a measuring device of the character described,
(a) a single piece body sub-assembly having
(1) a bottom skirt, and
(2) co-axial smaller projections forming an annular valve seat,
(b) a generally frusto conical single piece measuring chamber sub-assembly having
(1) a flange at its larger diameter end attachable to the said skirt on the body assembly, and
(2) means forming an internal tapered valve seat at its smaller diameter,
(c) said body and measuring chamber sub-assemblies forming a mixing chamber, and said measuring sub-assembly being replaceable to control the volume of said measuring chamber,
(d) a valve stem sub-assembly reciprocal within the body and having
(1) a tapered valve engageable against said tapered valve seat,
(2) a disc valve engageable against said annular valve seat, and
(3) said valves being spaced to clear one as the other opens,
(e) means providing a passageway through said body with one end adapted for communication with a source of liquid and one end communicating with the measuring chamber within said annular valve seat.

12. In a measuring device of the character described,
(a) a single piece body sub-assembly having
(1) a bottom skirt, and
(2) co-axial smaller projections forming an annular valve seat,
(b) a generally frusto conical single piece measuring chamber sub-assembly having
(1) a flange at its larger diameter end, and
(2) means forming an internal tapered valve seat at its smaller diameter,
(c) means securing said skirt and flange together to form a mixing chamber defined by said body and measuring chamber sub-assemblies,
(d) a valve stem sub-assembly reciprocable within the body and having
(1) a tapered valve engageable against said tapered valve seat,
(2) a disc valve engageable against said annular valve seat, and
(3) said valves being spaced to close one as the other opens, (e) means providing a passageway through said body with one end adapted for communication with a source of liquid and one end communicating with the measuring chamber within said annular valve seat.

References Cited in the file of this patent

UNITED STATES PATENTS

| | | |
|---|---|---|
| 23,008 | Bigelow | Feb. 22, 1859 |
| 1,322,559 | Gethman | Nov. 25, 1919 |
| 1,651,731 | Schatz | Dec. 6, 1927 |
| 1,792,181 | Olsen | Feb. 10, 1931 |
| 1,834,628 | Marshall et al. | Dec. 1, 1931 |
| 1,969,385 | Raemer | Aug. 7, 1934 |
| 2,532,787 | Romyns | Dec. 5, 1950 |

FOREIGN PATENTS

| | | |
|---|---|---|
| 806,644 | Germany | June 18, 1951 |